United States Patent
Alotaibi et al.

(10) Patent No.: US 12,445,019 B2
(45) Date of Patent: Oct. 14, 2025

(54) MONITORING SYSTEM FOR ELECTRICAL MOTORS INSULATION

(71) Applicant: SAUDI ARABIAN OIL COMPANY, Dhahran (SA)

(72) Inventors: Nasser Monif Alotaibi, Dhahran (SA); Ali Ahmed Alameer, Dhahran (SA)

(73) Assignee: SAUDI ARABIAN OIL COMPANY, Dhahran (SA)

( * ) Notice: Subject to any disclaimer, the term of this patent is extended or adjusted under 35 U.S.C. 154(b) by 321 days.

(21) Appl. No.: 18/168,949

(22) Filed: Feb. 14, 2023

(65) Prior Publication Data
US 2024/0275244 A1    Aug. 15, 2024

(51) Int. Cl.
*H02K 11/25*    (2016.01)
*H02K 1/16*    (2006.01)
*H02K 3/28*    (2006.01)
*H02K 3/30*    (2006.01)
*H02K 3/34*    (2006.01)

(52) U.S. Cl.
CPC .............. *H02K 11/25* (2016.01); *H02K 1/16* (2013.01); *H02K 3/28* (2013.01); *H02K 3/30* (2013.01); *H02K 3/345* (2013.01)

(58) Field of Classification Search
CPC . H02K 11/25; H02K 1/16; H02K 3/28; H02K 3/30; H02K 3/345
See application file for complete search history.

(56) References Cited

U.S. PATENT DOCUMENTS

| | | | | |
|---|---|---|---|---|
| 2010/0173140 A1* | 7/2010 | Tojo | ..................... | B32B 27/18 428/220 |
| 2012/0313462 A1* | 12/2012 | Hartmann | ............. | H02P 25/026 310/43 |
| 2018/0138772 A1* | 5/2018 | Calebrese | .................. | C09J 7/30 |
| 2021/0167665 A1* | 6/2021 | Cabello Eras | ........... | H02K 7/12 |
| 2021/0203212 A1* | 7/2021 | Fuchs | ....................... | H02K 3/50 |
| 2022/0198646 A1* | 6/2022 | Platz | ..................... | G06T 7/0004 |
| 2022/0255387 A1* | 8/2022 | Hubert | ..................... | H02K 3/30 |

FOREIGN PATENT DOCUMENTS

WO    WO-2018055004 A1 *   3/2018

OTHER PUBLICATIONS

"Condition Monitoring and Diagnostics of Motor and Stator Windings—A Review;" Dec. 20, 2013; pp. 1-11; Retrieved from the Internet: URL: https://irispower.com/learning-centre/condition-monitoring-diagnostics-motor-stator-windings-review/ (11 pages).

* cited by examiner

*Primary Examiner* — Lee E Rodak
*Assistant Examiner* — Zannatul Ferdous
(74) *Attorney, Agent, or Firm* — Osha Bergman Watanabe & Burton LLP

(57) ABSTRACT

A system includes an electric motor. The electric motor includes one or more windings wrapped around a magnetic core within one or more stator slots of the electric motor, where each of the one or more windings comprises two or more coils. The system further includes a groundwall insulation layer wrapped around the one two or more coils, and a sensor coupled to the one or more windings, where the sensor is a resistance temperature detector (RTD) configured to measure a temperature of the one or more windings at a 70% loading condition of the electric motor. The system also includes a controller connected to the sensor and a computer processor coupled to the controller.

12 Claims, 7 Drawing Sheets

MONITORING SYSTEM FOR ELECTRICAL MOTORS INSULATION

BACKGROUND

Industrially implemented electric motors may include an insulation system, which may be monitored to ensure appropriate protection. Current practices involve monitoring the thermal condition of the insulation system by comparing online temperature detection readings to a fixed threshold design temperature per applicable standards. Such practices may be performed regardless of loading on the motor.

SUMMARY

This summary is provided to introduce a selection of concepts that are further described below in the detailed description. This summary is not intended to identify key or essential features of the claimed subject matter, nor is it intended to be used as an aid in limiting the scope of the claimed subject matter.

In one aspect, embodiments disclosed herein relate to a system, which may include an electric motor. The electric motor may include one or more windings wrapped around a magnetic core within one or more stator slots of the electric motor, where each of the one or more windings comprises two or more coils. The system may further include a groundwall insulation layer wrapped around the one two or more coils, and a sensor coupled to the one or more windings, where the sensor is a resistance temperature detector (RTD) configured to measure a temperature of the one or more windings of the electric motor. The system may also include a controller connected to the sensor and a computer processor coupled to the controller.

In another aspect, embodiments disclosed herein relate to a method. The method may include providing an electric motor, where the electric motor comprises one or more windings wrapped around a magnetic core within one or more stator slots of the electric motor, and a groundwall insulation layer wrapped around the one two or more coils. Each of the one or more windings may include two or more coils. The method may also include coupling a sensor to the electric motor, activating the sensor using a controller, and measuring a temperature of the one or more windings of the electric motor using the sensor. The method may further include estimating, using a computer processor, a temperature of the one or more windings at a 100% loading condition of the electric motor, and comparing, using the computer processor, the temperature of the one or more windings at the 100% loading condition to one or more international standards.

Other aspects and advantages of the claimed subject matter will be apparent from the following description and the appended claims.

BRIEF DESCRIPTION OF DRAWINGS

Specific embodiments of the disclosed technology will now be described in detail with reference to the accompanying figures. Like elements in the various figures are denoted by like reference numerals for consistency. The size and relative positions of elements in the drawings are not necessarily drawn to scale. For example, the shapes of various elements and angles are not necessarily drawn to scale, and some of these elements may be arbitrarily enlarged and positioned to improve drawing legibility. Further, the particular shapes of the elements as drawn are not necessarily intended to convey any information regarding the actual shape of the particular elements and have been solely selected for ease of recognition in the drawing.

DETAILED DESCRIPTION

Figure 1A:
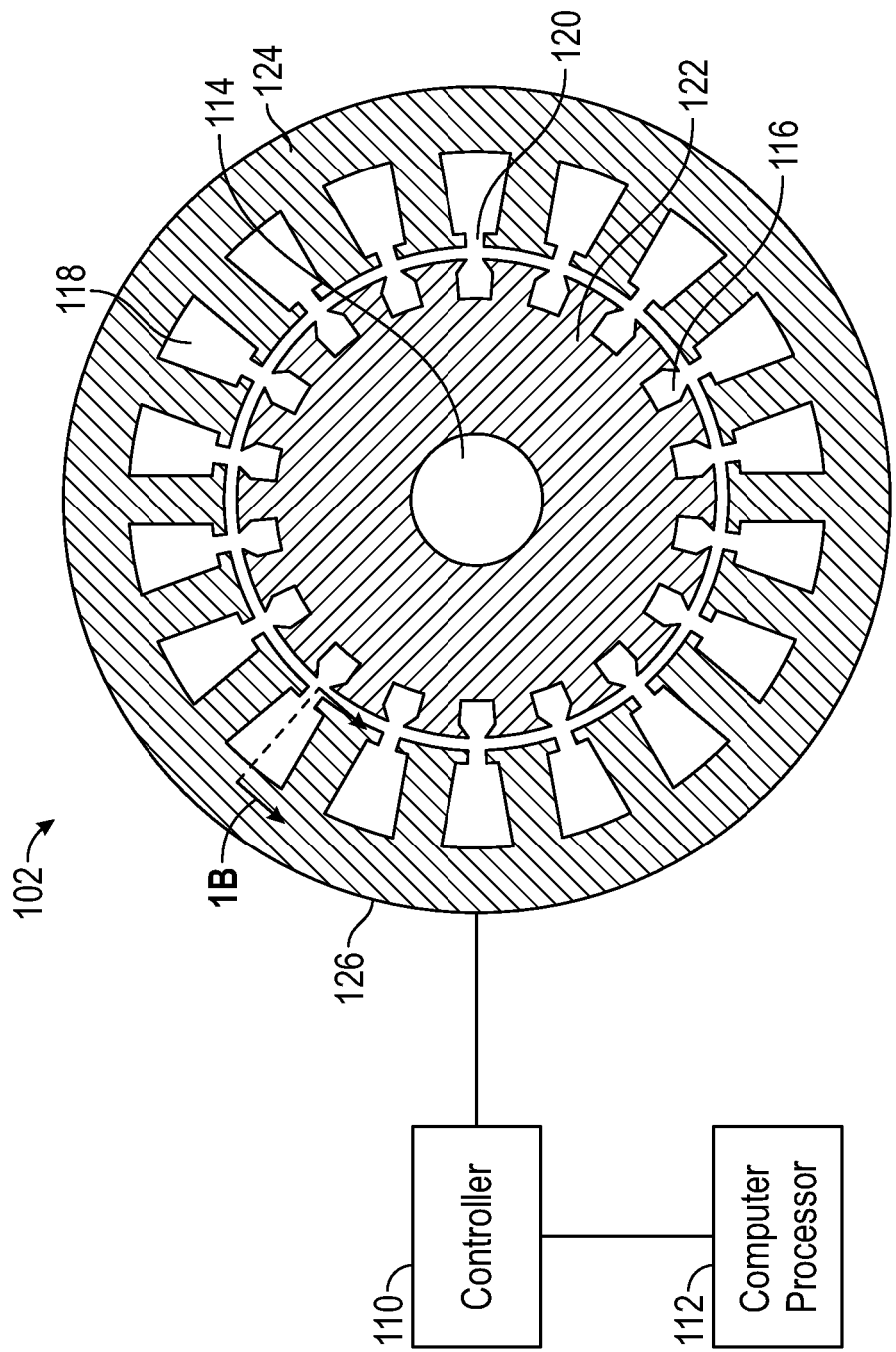
FIGS. 1A and 1B shows an electric motor in accordance with one or more embodiments.

In the following detailed description of embodiments of the disclosure, numerous specific details are set forth in order to provide a more thorough understanding of the disclosure. However, it will be apparent to one of ordinary skill in the art that the disclosure may be practiced without these specific details. In other instances, well-known features have not been described in detail to avoid unnecessarily complicating the description.

Throughout the application, ordinal numbers (e.g., first, second, third, etc.) may be used as an adjective for an element (i.e., any noun in the application). The use of ordinal numbers is not to imply or create any particular ordering of the elements nor to limit any element to being only a single element unless expressly disclosed, such as using the terms "before", "after", "single", and other such terminology. Rather, the use of ordinal numbers is to distinguish between the elements. By way of an example, a first element is distinct from a second element, and the first element may encompass more than one element and succeed (or precede) the second element in an ordering of elements.

In the following description of FIGS. 1A-5, any component described with regard to a figure, in various embodiments disclosed herein, may be equivalent to one or more like-named components described with regard to any other figure. For brevity, descriptions of these components will not be repeated with regard to each figure. Thus, each and every embodiment of the components of each figure is incorporated by reference and assumed to be optionally present within every other figure having one or more like-named components. Additionally, in accordance with various embodiments disclosed herein, any description of the components of a figure is to be interpreted as an optional embodiment which may be implemented in addition to, in conjunction with, or in place of the embodiments described with regard to a corresponding like-named component in any other figure.

In one aspect, embodiments disclosed herein relate to a system for determining electric motor insulation condition at different loadings. More specifically, embodiments disclosed herein relate to a method for relating winding temperature of electric motors with percentage loading to determine the health of the electric motor's insulation. More specifically, embodiments disclosed herein aim to improve the existing online monitoring and protection of an electric motor insulation system. The current practice of monitoring the thermal condition of the machine's insulation is by comparing the online temperature detection readings to a fixed threshold design temperature, as per applicable standards, regardless of the loading on the machine. To improve upon this, the presented novel model defines the motor winding threshold temperature as a function of the machine loading, allowing an accurate monitoring of the insulation at different loadings and better analyzing the insulation and overall machine condition, potentially protecting the motor from premature failures.

Turning to FIG. 1A, FIG. 1A shows an electric motor 102 in accordance with one or more embodiments. The electric motor 102 may be, for example, an industrial motor. The electric motor 102 may primarily be comprised of a central shaft 114 surrounded by a layer of circumferentially arranged rotor slots 116 and a layer of circumferentially arranged stator slots 118. In one or more embodiments, the rotor slots 116 may be positioned closer to the shaft 114, and the rotor slots 116 and the stator slots 118 may be separated by an air gap 120, which extends a full 360°. Rotor laminations 122 may fill the cross-sectional space between the shaft 114 and the rotor slots 116. Further, stator laminations 124 may fill the cross-sectional space between the stator slots 118 and the external circumference 126 of the electric motor 102.

Figure 1B:
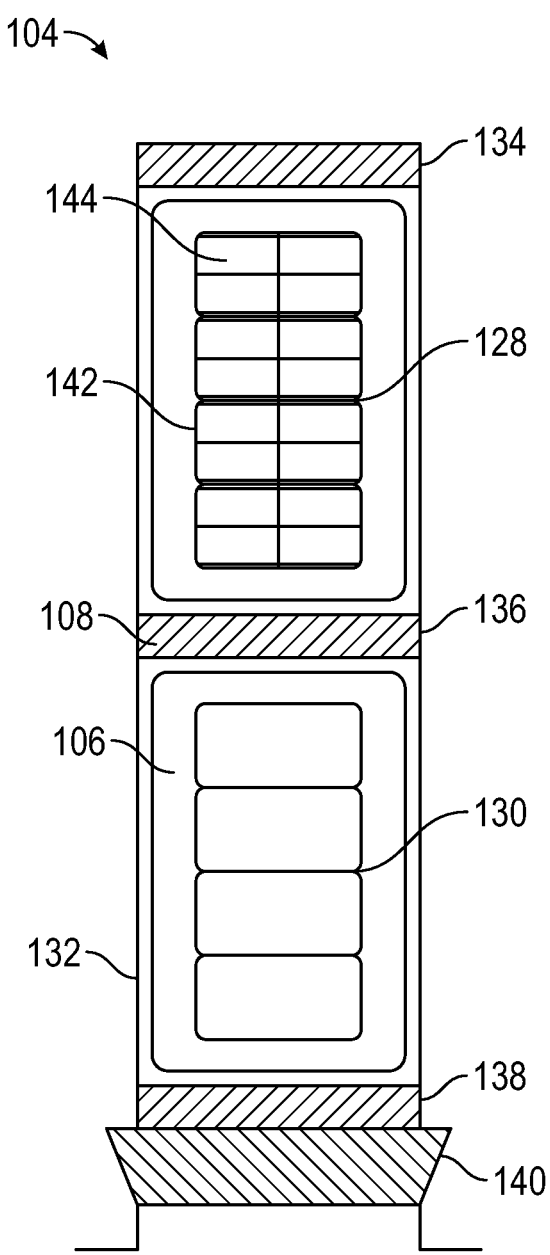

In one or more embodiments, windings 104 may be located in each stator slot 118. FIG. 1B shows a cross-sectional view of a stator slot 118 and an included winding 104 in accordance with one or more embodiments. Each winding 104 may include an upper coil 128 and a lower coil 130. Each coil 128, 130 may be an individual form wound coil, such that the upper coil 128 and the lower coil 130 may be stacked together to form the winding 104. Individual form wound coils, as one skilled in the art will be aware, include turn insulation 142 and strand insulation 144 wrapped around the coils 128, 130 themselves. Further, individual form wound coils also include a groundwall insulation layer 106 secured around the exterior of each coil 128, 130. The groundwall insulation layer 106 may be composed, for example, of polyester film or aramid paper. A semiconductive coating 132 may form an exterior boundary around the groundwall insulation layer 106.

A bottom packing layer 134 may be secured to one end of the upper coil 128. A midstick packing layer 136 may be disposed between the upper coil 128 and the lower coil 130. A top packing layer 138 may be secured to an end of the lower coil 130, effectively between the lower coil 130 and a slot wedge 140 configured to secure the winding 104 into the stator slot 118.

A sensor 108 may be coupled to the one or more windings 104, where the sensor 108 is positioned in the midstick packing layer 136 and is configured to monitor the temperature of the groundwall insulation layer 106 of each coil 128, 130. In one or more embodiments, there may be between 6 and 9 sensors 108 installed in the electric motor 102, each sensor 108 installed in a different location. The sensor 108, in accordance with one or more embodiments, may be a resistance temperature detector (RTD). The sensor 108 may be configured to measure a temperature of the one or more windings 104 of the electric motor 102. A controller 110 may be connected to each sensor 108 installed in the electric motor 102. Further, a computer processor 112 may be connected, wired or wirelessly, to the controller 110.

Figure 6:
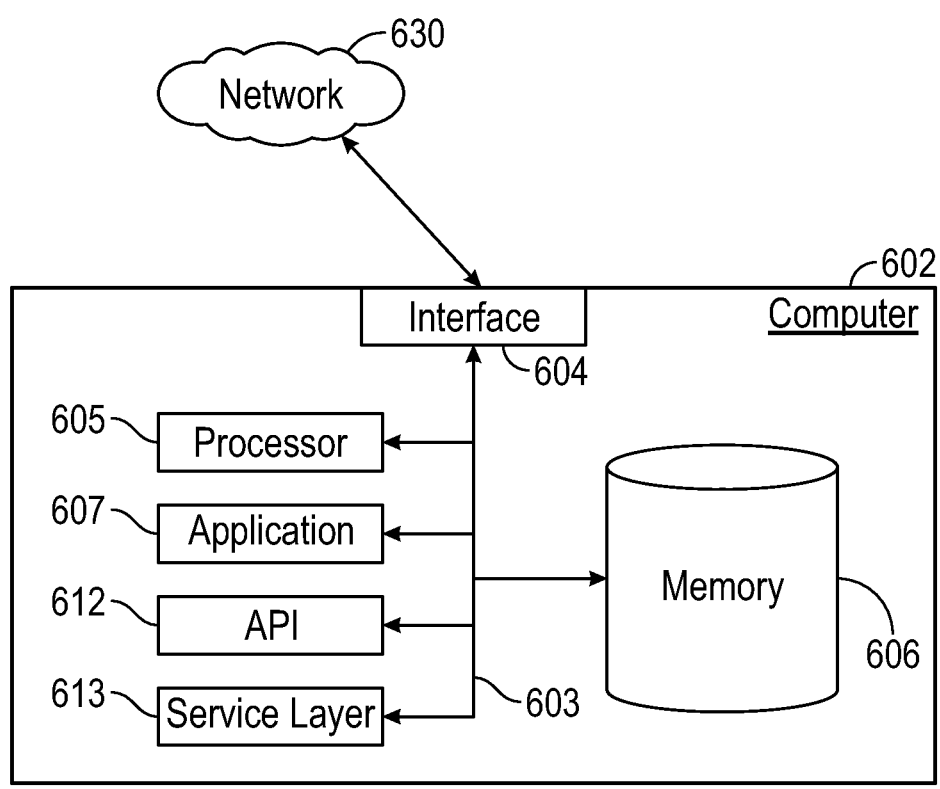
FIG. 6 shows a computer system in accordance with one or more embodiments.

The computer processor 112 may be configured to receive temperature data from the RTD and to estimate the temperature data at a 100% loading condition of the electric motor. For example, the temperature data may include a temperature rise, which may be plotted against percentage loading using the computer processor 112. The computer processor may be a dedicated hardware, or may be part of a computing device as shown in FIG. 6 below.

Figure 2:
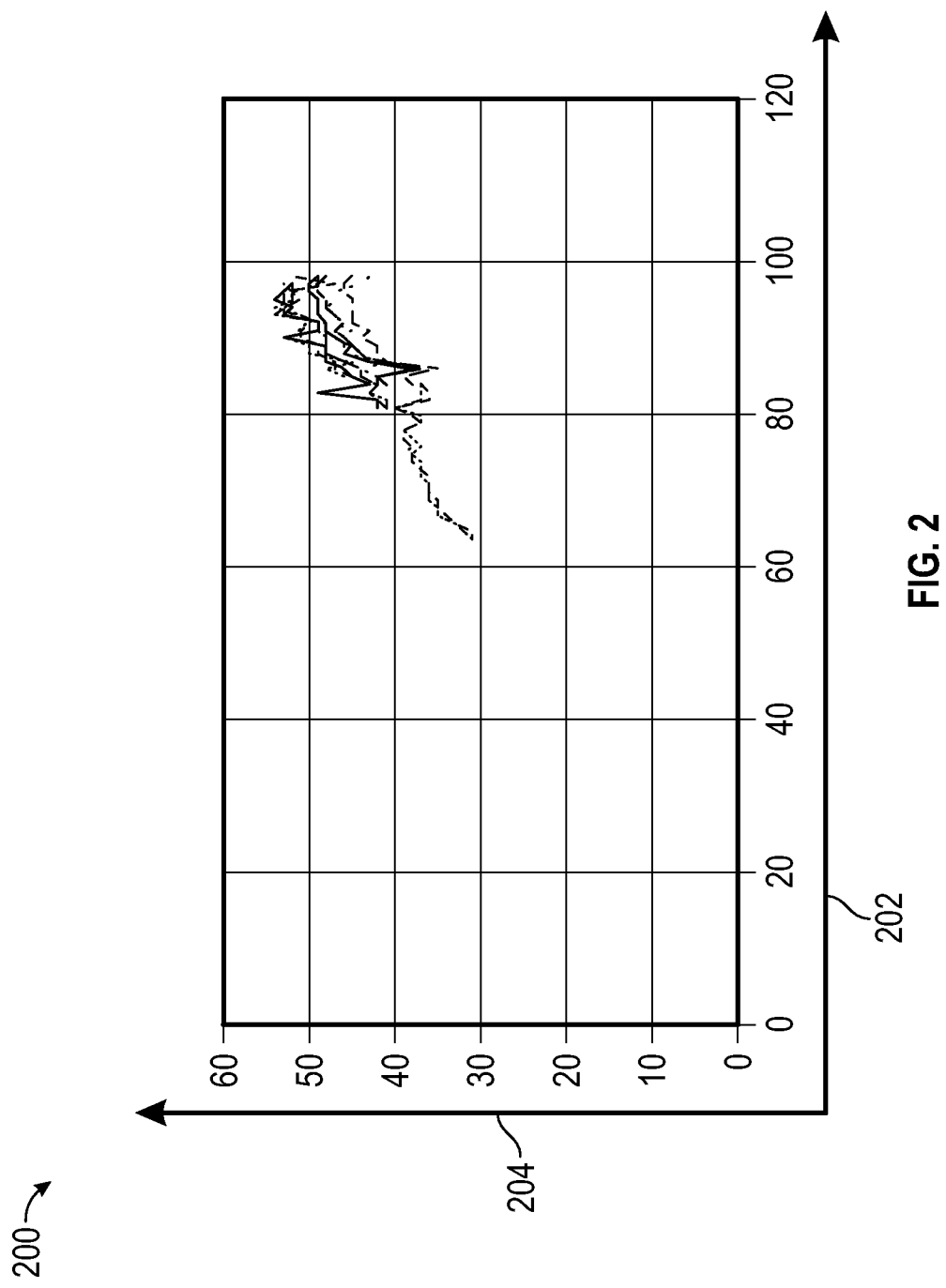
FIG. 2 shows a plot in accordance with one or more embodiments.

Turning now to FIG. 2, FIG. 2 shows a plot 200 in accordance with one or more embodiments. The x-axis 202 shows percentage loading and the y-axis 204 shows temperature rise in Celsius. Plot 200 shows the temperature rise of several induction and synchronous motors plotted against percentage loading. In one or more embodiments, it may be proven that temperature rise is proportionally related to percentage loading, as shown in plot 200 in FIG. 2.

Figure 3:
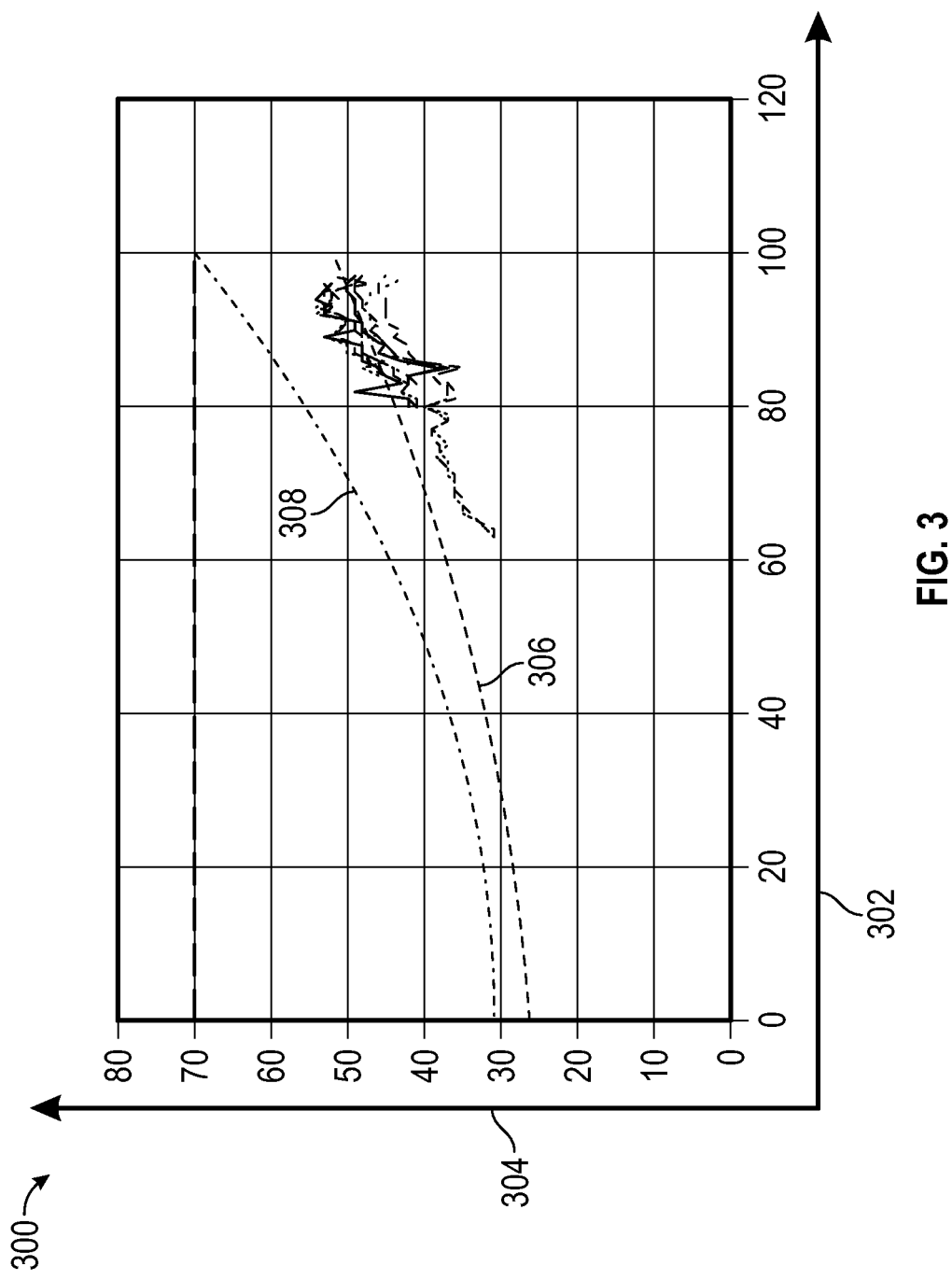
FIG. 3 shows a plot in accordance with one or more embodiments.

The computer processor 112 may further be configured to plot the temperature rise of two different electric motors 102 with two fitted curves, as shown in plot 300 in FIG. 3. More specifically, plot 300 may superimpose two fitted curves onto plot 200. Similar to plot 200 in FIG. 2, the x-axis 302 of plot 300 shows percentage loading and the y-axis 304 of plot 300 shows temperature rise in Celsius. A first curve 306 may approximate the average temperature rise with respect to percentage loading. The first curve 306 may intersect the y-axis 304 at approximately 25° C., indicating that the typical temperature rise at zero load may be around 25° C.-35° C.

A second curve 308 may be defined such that the second curve 308 extends from the y-axis 304 at zero load to a temperature rise of 70° C. at 100% loading. In one or more embodiments, a temperature rise of 70° C. at 100% loading may refer to the National Electrical Manufacturers Association (NEMA) Motors and Generators (MG) limit for class B motors. One skilled in the art will be aware the NEMA classifies motors according to the motor winding insulation maximum temperature.

Both the first curve 306 and the second curve 308 define temperature rise as a second degree polynomial function of the loading percentage, as defined in Equation 1:

$$T_{rise} = a*PL^2 + b*PL + C, \quad \text{Equation 1}$$

where $T_{rise}$ is the temperature rise in Celsius, PL is the percentage loading, and a, b, and C are constants, defined in Equations 2-4:

$$C = T_{rise\_zero}, \quad \text{Equation 2}$$

$$a = \frac{S - T_{class} + C}{0.9}, \quad \text{Equation 3}$$

$$b = T_{class} - a - C, \quad \text{Equation 4}$$

where $T_{rise}$ zero is the temperature rise at zero load, $T_{class}$ is the allowable temperature rise, and S is the slope of the curve in the linear region of the plot.

The linear region of the plot may be found between 60% and 100% loading. In one or more embodiments, it may be advantageous to select a slope in the range of 40% to 70% loading. The slope may be selected based on the condition of criticality of the electric motor. For new, critical electric motors 102, a 70% slope may be selected since the electric motor 102 is in a generally good condition and may adhere to more stringent guidelines than, for example, an older electric motor 102. As the electric motor 102 ages, the slope may be relaxed to a minimum of 40%. Similarly, non-critical electric motors 102 may have a slope that is as low as 40% since non-critical motors may adhere to less stringent guidelines than critical motors. $T_{rise\_zero}$, in accordance with one or more embodiments, may typically range between 25 to 30° C. $T_{class}$ may be 70° C. for class B electric motors.

Figure 4:
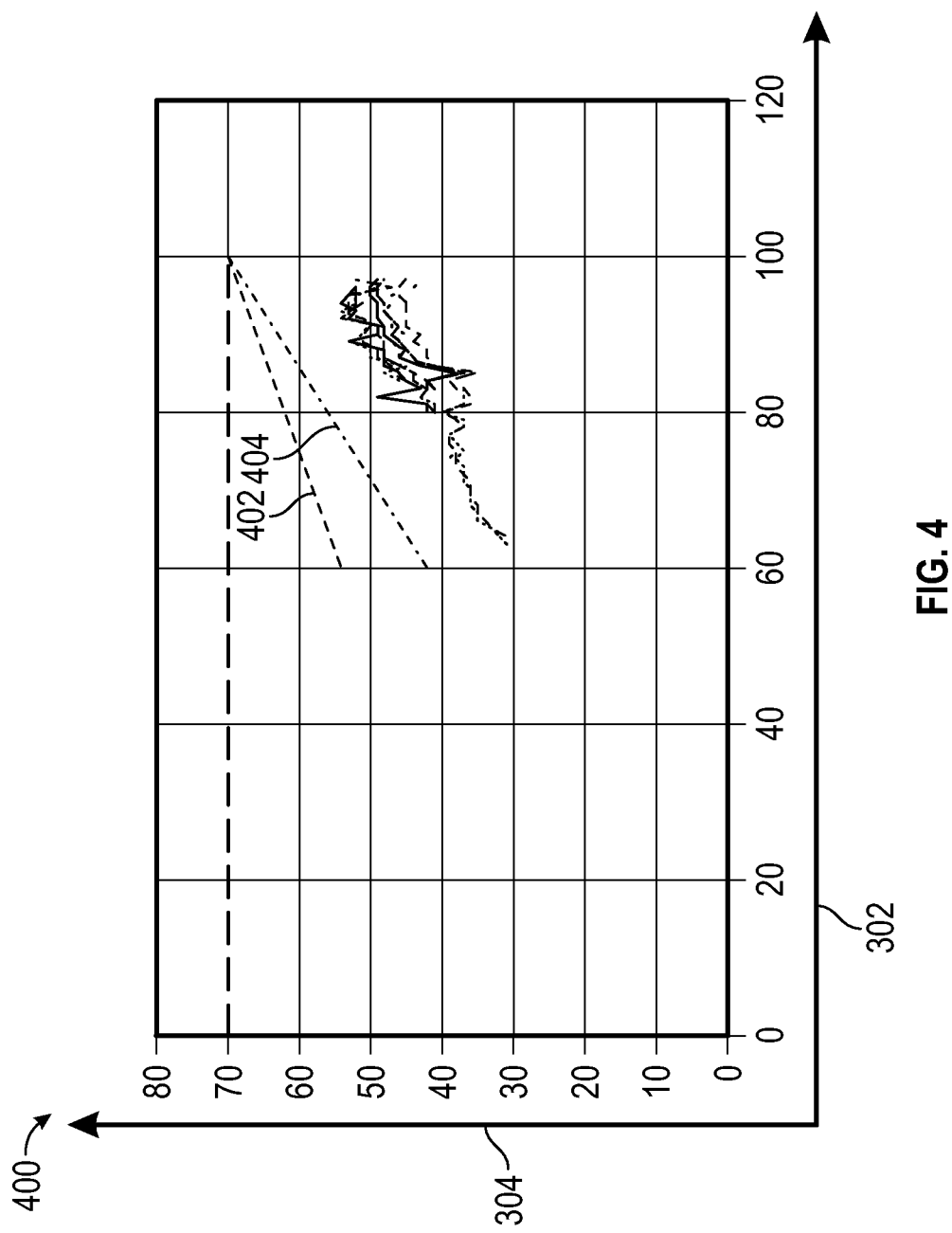
FIG. 4 shows a plot in accordance with one or more embodiments.

In a typical operating range of 60%-100% loading, the relationship between the temperature rise and percentage loading may be estimated as a linear line, as shown in plot 400 in FIG. 4. The first curve 306 may be estimated as a line and shifted up towards the limit (70° C. temperature rise) to produce the first estimated linear section 402.

The second curve 308 may also be estimated as a line to produce the second estimated linear section 404. As is clear from plot 400, the first estimated linear section 402 may have a gentler slope than the second estimated linear section 404 based on the value of S selected. For example, in one or more embodiments, the first estimated linear section 402 may have a slope of 40, while the second estimated linear section 404 may have a slope of 70.

Both the first estimated linear section 402 and the second estimated linear section 404 reflect the average and maximum temperature changes of all electric motors 102 analyzed. Since the maximum allowed temperature change at 100% loading is 70° C., both the first estimated linear section 402 and the second estimated linear section 404 have been shifted to reflect a 70° C.-temperature change at 100% loading. As such, it is possible to determine the maximum allowable temperature change for loads lower than 100%.

Continuing with FIG. 1, the computer processor 112 may further be configured to compare the temperature data at the 100% loading condition to one or more international standards. In one or more embodiments, the one or more international standards may refer to the NEMA MG standards. The one or more international standards may be selected on the insulation type of the insulation layer 106.

The system 100 may further include an alarm or capability to send an alert signal, which may be configured to actuate if the temperature data at the 100% loading condition exceeds the one or more international standards. In some embodiments, the computer processor 112 may be configured to issue a termination command to the motor via the controller 110 if the temperature data at the 100% loading condition exceeds the one or more international standards. As a result, the electric motor 102 may be shut down to protect the insulation layer 106.

Ensuring that the insulation layer 106 is protected is imperative to the life of the electric motor 102. For example, in embodiments where the international standards dictate that the maximum temperature of the insulation layer 106 is 120° C., if the temperature of the electric motor 102 (and therefore the insulation layer 106) exceeds this maximum threshold, the lifetime of the insulation layer 106 may decrease by one half for each 10° C. over the maximum temperature.

Figure 5:
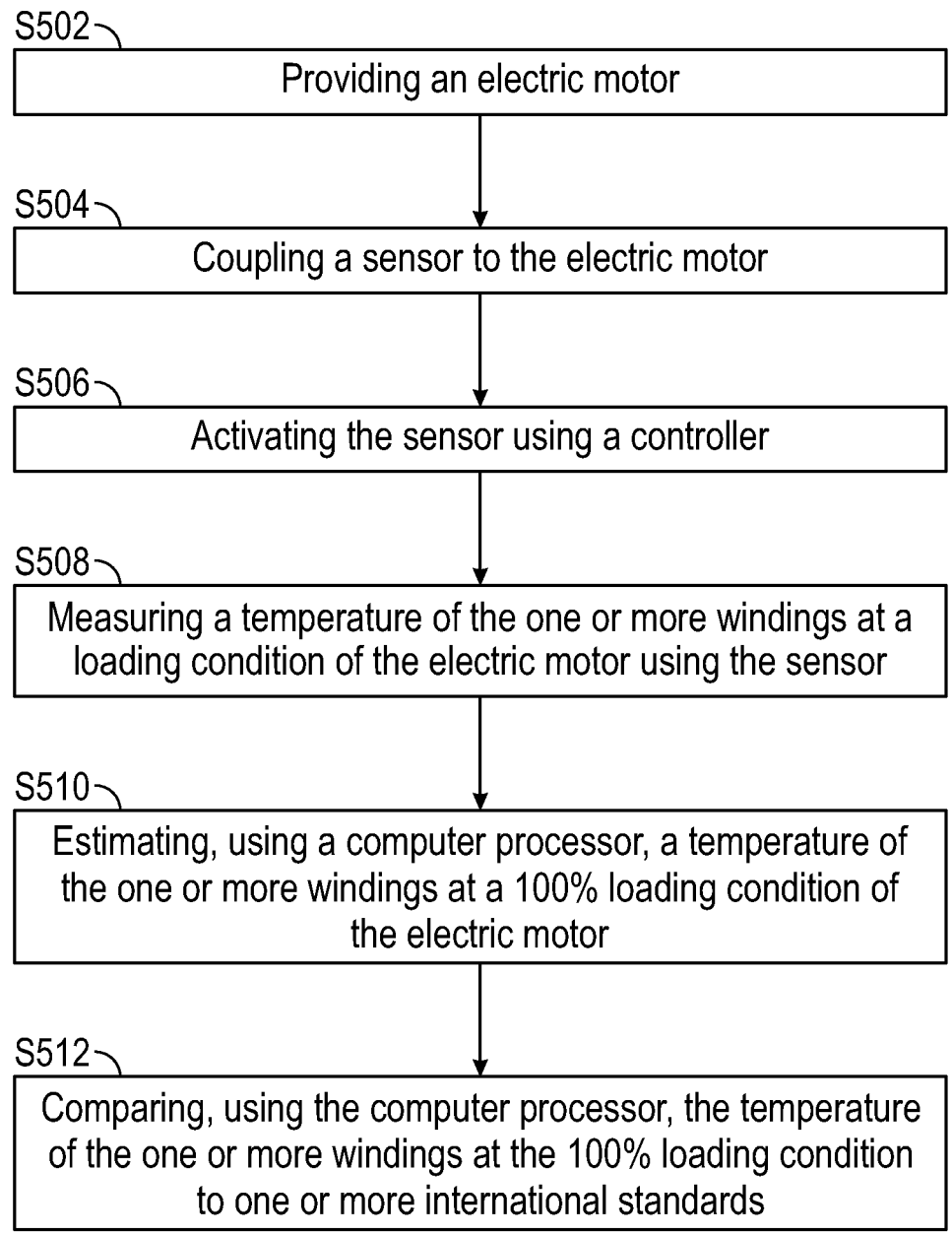
FIG. 5 shows a flowchart of a method in accordance with one or more embodiments.

FIG. 5 depicts a flowchart in accordance with one or more embodiments. More specifically, FIG. 5 depicts a flowchart 500 of a method of determining the health of an insulation layer of an electric motor. Further, one or more blocks in FIG. 5 may be performed by one or more components as described in FIG. 1-4. While the various blocks in FIG. 5 are presented and described sequentially, one of ordinary skill in the art will appreciate that some or all of the blocks may be executed in different orders, may be combined, may be omitted, and some or all of the blocks may be executed in parallel. Furthermore, the blocks may be performed actively or passively.

Initially, an electric motor 102 may be provided, S502. The electric motor 102 may include one or more windings 104 wrapped around a magnetic core 105. An insulation layer 106 may be wrapped around the one or more windings 104. A sensor 108 may be coupled to the electric motor 102, S504. Specifically, the sensor 108 may be coupled to the one or more windings 104. The sensor 108 may be, for example, a resistance temperature detector (RTD).

In one or more embodiments, the sensor 108 may be activated using a controller 110, S506. The controller 110 may receive commands from a computer processor 112. A temperature of the one or more windings 104 may be measured using the sensor 108 when the electric motor 102 is operating at a loading condition, S508. The loading condition may range, for example, between 60% and 100%. Using the computer processor 112, a temperature of the one or more windings 104 at a 100% loading condition of the electric motor 102 may be estimated, S510. This may be accomplished, for example, using Equations 1~4 and plot 400.

Using the equations/formulas presented above, a determination is made as to the condition of the insulation at different loadings, and the limit can be adjusted with the specific loading. More specifically, once a temperature reading is obtained by the sensor 108, a temperature change may be calculated as the difference between the temperature reading and the ambient temperature. Motor loading may be obtained, for example, directly from the system, or may be estimated as either a ratio of measured motor current to rated current or a ratio of measured driven equipment power to rated power, Based on the selected slope, the temperature reading may then be estimated at 100% loading.

The estimated temperature of the one or more windings 104 at the 100% loading condition may be compared, using the computer processor 112, to one or more international standards, S512. The one or more international standards may be selected based on the insulation type of the insulation layer 106. Further, the one or more international standards may be, for example, the NEMA MG standards.

The method may further include determining that the temperature of the one or more windings at the 100% loading condition exceeds the one or more international standards. In such embodiments, if the one or more international standards are exceeded, an alarm may be actuated. In further embodiments, the computer processor 112 may issue a termination command via the controller 110, shutting off the electric motor 102 in addition to actuating the alarm. Using the method described in FIG. 5, the health of the electric motor can be assessed, enhancing the reliability of the electric rotating machines by monitoring the condition of these machines accurately.

FIG. 6 depicts a block diagram of a computer system 602 used to provide computational functionalities associated with described algorithms, methods, functions, processes, flows, and procedures as described in this disclosure, according to one or more embodiments. The illustrated computer 602 is intended to encompass any computing device such as a server, desktop computer, laptop/notebook computer, wireless data port, smart phone, personal data assistant (PDA), tablet computing device, one or more processors within these devices, or any other suitable processing device, including both physical or virtual instances (or both) of the computing device. Additionally, the computer 602 may include a computer that includes an input device, such as a keypad, keyboard, touch screen, or other device that can accept user information, and an output device that conveys information associated with the operation of the computer 602, including digital data, visual, or audio information (or a combination of information), or a GUI.

The computer 602 can serve in a role as a client, network component, a server, a database or other persistency, or any other component (or a combination of roles) of a computer system for performing the subject matter described in the instant disclosure. The illustrated computer 602 is communicably coupled with a network 630. In some implementations, one or more components of the computer 602 may be configured to operate within environments, including cloud-computing-based, local, global, or other environment (or a combination of environments).

At a high level, the computer 602 is an electronic computing device operable to receive, transmit, process, store, or manage data and information associated with the described subject matter. According to some implementations, the computer 602 may also include or be communicably coupled with an application server, e-mail server, web server, caching server, streaming data server, business intelligence (BI) server, or other server (or a combination of servers).

The computer 602 can receive requests over network 630 from a client application (for example, executing on another computer 602) and responding to the received requests by processing the said requests in an appropriate software application. In addition, requests may also be sent to the computer 602 from internal users (for example, from a command console or by other appropriate access method), external or third-parties, other automated applications, as well as any other appropriate entities, individuals, systems, or computers.

Each of the components of the computer 602 can communicate using a system bus 603. In some implementations, any or all of the components of the computer 602, both hardware or software (or a combination of hardware and software), may interface with each other or the interface 604 (or a combination of both) over the system bus 603 using an application programming interface (API) 612 or a service layer 613 (or a combination of the API 612 and service layer 613. The API 612 may include specifications for routines, data structures, and object classes. The API 612 may be either computer-language independent or dependent and refer to a complete interface, a single function, or even a set of APIs. The service layer 613 provides software services to the computer 602 or other components (whether or not illustrated) that are communicably coupled to the computer 602. The functionality of the computer 602 may be accessible for all service consumers using this service layer. Software services, such as those provided by the service layer 613, provide reusable, defined business functionalities through a defined interface. For example, the interface may be software written in JAVA, C++, or other suitable language providing data in extensible markup language (XML) format or another suitable format. While illustrated as an integrated component of the computer 602, alternative implementations may illustrate the API 612 or the service layer 613 as stand-alone components in relation to other components of the computer 602 or other components (whether or not illustrated) that are communicably coupled to the computer 602. Moreover, any or all parts of the API 612 or the service layer 613 may be implemented as child or sub-modules of another software module, enterprise application, or hardware module without departing from the scope of this disclosure.

The computer 602 includes an interface 604. Although illustrated as a single interface 604 in FIG. 6, two or more interfaces 604 may be used according to particular needs, desires, or particular implementations of the computer 602. The interface 604 is used by the computer 602 for communicating with other systems in a distributed environment that are connected to the network 630. Generally, the interface 604 includes logic encoded in software or hardware (or a combination of software and hardware) and operable to communicate with the network 630. More specifically, the interface 604 may include software supporting one or more communication protocols associated with communications such that the network 630 or interface's hardware is operable to communicate physical signals within and outside of the illustrated computer 602.

The computer 602 includes at least one computer processor 605. Although illustrated as a single computer processor 605 in FIG. 6, two or more processors may be used according to particular needs, desires, or particular implementations of the computer 602. Generally, the computer processor 605 executes instructions and manipulates data to perform the operations of the computer 602 and any machine learning networks, algorithms, methods, functions, processes, flows, and procedures as described in the instant disclosure.

The computer 602 also includes a memory 606 that holds data for the computer 602 or other components (or a combination of both) that can be connected to the network 630. For example, memory 606 can be a database storing data consistent with this disclosure. Although illustrated as a single memory 606 in FIG. 6, two or more memories may be used according to particular needs, desires, or particular implementations of the computer 602 and the described functionality. While memory 606 is illustrated as an integral component of the computer 602, in alternative implementations, memory 606 can be external to the computer 602.

The application 607 is an algorithmic software engine providing functionality according to particular needs, desires, or particular implementations of the computer 602, particularly with respect to functionality described in this disclosure. For example, application 607 can serve as one or more components, modules, applications, etc. Further, although illustrated as a single application 607, the application 607 may be implemented as multiple applications 607 on the computer 702. In addition, although illustrated as integral to the computer 602, in alternative implementations, the application 607 can be external to the computer 602.

There may be any number of computers 602 associated with, or external to, a computer system containing a computer 602, wherein each computer 602 communicates over network 630. Further, the term "client," "user," and other appropriate terminology may be used interchangeably as appropriate without departing from the scope of this disclosure. Moreover, this disclosure contemplates that many users may use one computer 602, or that one user may use multiple computers 602.

Embodiments of the present disclosure may provide at least one of the following advantages. Currently available systems determine the health of the electric motor insulation layer by comparing the temperature rise to a fixed limits per applicable standards, regardless of loading on the electric motor. Embodiments of the present disclosure allow for determining the health of the insulation layer at different percentage loadings, where the limit may be adjusted with specific loading. As such, embodiments of the present disclosure allow for increased reliability and accuracy in monitoring of the health of the insulation layer. Further, estimation of the temperature of the windings at 100% loading conditions allows for the electric motor to be switched off or for operational instructions to be altered to ensure that the insulation layer is not subjected to temperatures which exceed applicable standards. As such, embodiments of the present disclosure actively protect the health of the insulation layer, leading to less component failures and reduced component downtime, which may be required for replacement and/or repair.

Although only a few example embodiments have been described in detail above, those skilled in the art will readily appreciate that many modifications are possible in the example embodiments without materially departing from this invention. Accordingly, all such modifications are intended to be included within the scope of this disclosure as defined in the following claims.

What is claimed:

1. A system, comprising:
an electric motor, comprising:
one or more windings wrapped around a magnetic core within one or more stator slots of the electric motor, wherein each of the one or more windings comprises two or more coils, and
a groundwall insulation layer wrapped around the two or more coils;
a sensor coupled to the one or more windings,
wherein the sensor is a resistance temperature detector (RTD) configured to measure a temperature of the one or more windings at a specified loading condition of the electric motor;
a controller connected to the sensor; and
a computer processor coupled to the controller, the computer processor configured to receive temperature data from the RTD and to determine estimated temperature data at a 100% loading condition of the electric motor based, at least in part, on the received temperature data,
wherein the computer processor is further configured to compare the estimated temperature data at the 100% loading condition to international standards.

2. The system of claim 1, wherein the electric motor is an industrial motor.

3. The system of claim 1, wherein an alarm is configured to actuate if the estimated temperature data at the 100% loading condition exceeds the one or more international standards.

4. The system of claim 1, wherein the one or more international standards are selected based on a type of the groundwall insulation layer.

5. The system of claim 1, wherein the groundwall insulation layer is composed of polyester film and aramid paper.

6. The system of claim 1, wherein the sensor is positioned between the two or more coils in a midstick packing layer.

7. A method, comprising:
providing an electric motor,
wherein the electric motor comprises:
one or more windings wrapped around a magnetic core within one or more stator slots of the electric motor, wherein each of the one or more windings comprises two or more coils, and
a groundwall insulation layer wrapped around the two or more coils;
coupling a sensor to the electric motor;
activating the sensor using a controller;
measuring a temperature of the one or more windings at a specified loading condition of the electric motor using the sensor;
determining, using a computer processor, an estimated temperature value of the one or more windings at a 100% loading condition of the electric motor; and
comparing, using the computer processor, the estimated temperature of the one or more windings at the 100% loading condition to one or more international standards.

8. The method of claim 7, further comprising:
determining that the estimated temperature of the one or more windings at the 100% loading condition exceeds the one or more international standards; and
actuating an alarm.

9. The method of claim 8, further comprising shutting off the electric motor.

10. The method of claim 7, further comprising selecting the one or more international standards based, at least in part, on a type of the groundwall insulation layer.

11. The method of claim 7, wherein the sensor is a resistance temperature detector (RTD).

12. The method of claim 7, wherein coupling the sensor to the electric motor comprises positioning the sensor between the two or more coils in a midstick packing layer.

* * * * *